(12) United States Patent
Lim et al.

(10) Patent No.: US 10,860,501 B2
(45) Date of Patent: Dec. 8, 2020

(54) REDUNDANCY METHOD AND SYSTEM OF THREE-DIMENSIONAL LAMINATED MEMORY

(71) Applicants: HYUNDAI MOTOR COMPANY, Seoul (KR); KIA MOTORS CORPORATION, Seoul (KR)

(72) Inventors: Hong Yeol Lim, Incheon (KR); Jin Ha Choi, Suwon-si (KR); Jin Kyu Hwang, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/505,239

(22) Filed: Jul. 8, 2019

(65) Prior Publication Data

US 2020/0192831 A1 Jun. 18, 2020

(30) Foreign Application Priority Data

Dec. 18, 2018 (KR) .......... 10-2018-0164294

(51) Int. Cl.
*G06F 13/16* (2006.01)
*G06F 9/34* (2018.01)
*G06F 9/50* (2006.01)
*G06F 9/38* (2018.01)
*G06F 11/00* (2006.01)
*G06F 12/00* (2006.01)
*G06F 11/16* (2006.01)
*G06F 9/30* (2018.01)

(52) U.S. Cl.
CPC .......... *G06F 13/1663* (2013.01); *G06F 9/34* (2013.01); *G06F 9/3877* (2013.01); *G06F 9/5016* (2013.01)

(58) Field of Classification Search
CPC .......... G06F 9/30; G06F 12/084; G06F 13/14; G06F 13/1663
See application file for complete search history.

(56) References Cited

U.S. PATENT DOCUMENTS

| 9,344,091 B2 | 5/2016 | Jayasena et al. |
| 2008/0109642 A1* | 5/2008 | Beutler ................. G06F 11/165 712/225 |
| 2010/0318879 A1* | 12/2010 | Yu ....................... G06F 11/1004 714/758 |

(Continued)

FOREIGN PATENT DOCUMENTS

KR 10-2017-0102418 A 9/2017

*Primary Examiner* — Getente A Yimer
(74) *Attorney, Agent, or Firm* — Morgan, Lewis & Bockius LLP

(57) ABSTRACT

A redundancy method of a three-dimensional laminated memory includes receiving, by first, second and third processors, a command for data operation, transmitting and receiving, by each of the second and third processors, data through dedicated data buses in order to perform the data operation, receiving, by the first processor, operation result values of the second and third processors from a main memory, comparing, by a result value comparator of the first processor, the operation result values of the first, second and third processors, and outputting, by the result value comparator, operation result values in correspondence with the result of comparison.

15 Claims, 3 Drawing Sheets

(56) References Cited

U.S. PATENT DOCUMENTS

| | | | |
|---|---|---|---|
| 2014/0244930 A1* | 8/2014 | Lee | G11C 11/1673 |
| | | | 711/118 |
| 2014/0258592 A1* | 9/2014 | Rostoker | G06F 12/0246 |
| | | | 711/103 |
| 2014/0359225 A1* | 12/2014 | Lee | G06F 12/084 |
| | | | 711/130 |
| 2015/0089165 A1* | 3/2015 | Stark | G06F 9/3836 |
| | | | 711/154 |

* cited by examiner

REDUNDANCY METHOD AND SYSTEM OF THREE-DIMENSIONAL LAMINATED MEMORY

CROSS REFERENCE TO RELATED APPLICATION

This application claims the benefit of priority to Korea Application No. 10-2018-0164294 filed on Dec. 18, 2018 in the Korea Intellectual Property Office, which is hereby incorporated in its entirety by reference.

TECHNICAL FIELD

The present disclosure relates to a redundancy method and system of a three-dimensional laminated memory.

BACKGROUND

A three-dimensional laminated memory generally has a high-density high-performance memory structure including a plurality of layers of memory dies laminated on a base die and connected to each other using through silicon vias (TSVs). Performance of the base die is generally limited to a supporting logic for reading and writing data from and in the memory dies. Examples of the three-dimensional memory include a hybrid memory cube (hereinafter referred to as HMC) and a high bandwidth memory (hereinafter referred to as HBM).

The three-dimensional laminated memory technology according to the related art focuses upon a high-performance server-class system and thus does not consider a mechanism such as securing stability of data essential for functional safety in an operation system for a vehicle.

Accordingly, there is a need for a redundancy-based architecture capable of providing functional safety (stable operation and matching of data) at a vehicle controller level according to the three-dimensional laminated memory technology. To this end, there is a need for a voting mechanism for allocation of dedicated data buses and comparison and decision of operation result values, which is capable of providing functional safety in hardware in the three-dimensional laminated memory.

SUMMARY

Accordingly, the present disclosure is directed to a redundancy method and system of a three-dimensional laminated memory that substantially obviate one or more problems due to limitations and disadvantages of the related art.

More specifically, it is possible to provide a method of applying a voting mechanism for allocation of dedicated data buses and comparison and decision of operation result values, which is capable of providing functional safety in hardware in the three-dimensional laminated memory.

According to one exemplary embodiment of the present disclosure, a redundancy method of a three-dimensional laminated memory includes receiving, by first, second and third processors, data operation, transmitting and receiving, by each of the second and third processors, data through dedicated data buses in order to perform the data operation, receiving, by the first processor, operation result values of the second and third processors from a main memory, comparing, by a result value comparator of the first processor, the operation result values of the first, second and third processors, and outputting, by the result value comparator, operation result values in correspondence with the result of comparison.

In some embodiments, the first, second and third processors may independently perform a same data operation.

In some embodiments, the main memory may receive and store operation result values from the first, second and third processors.

In some embodiments, the comparing of the operation result values of the first, second and third processors may include determining whether all of the operation result values match.

In some embodiments, the result value comparator may compare numbers of identical operation result values when all of the operation result values do not match.

In some embodiments, the outputting of the operation result values in correspondence with the result of comparison may include transmitting operation result values having a largest number of identical operation result values among the operation result values.

In some embodiments, a first dedicated data bus allocated to the second processor and a second dedicated data bus allocated to the third processor may be physically allocated within the main memory.

In some embodiments, the redundancy method may further include reading, by the second and third processors, data from the main memory after a predetermined delay time, when the command for the data operation is received.

In some embodiments, different delay times may be applied to the second and third processors.

According to another exemplary embodiment of the present disclosure, a redundancy system of a three-dimensional laminated memory may include first, second and third processors physically isolated from each other; a main memory laminated between the second processor and the third processor; and a data bus including a first dedicated data bus allocated to the second processor and a second dedicated data bus allocated to the third processor, wherein the first, second and third processors perform data operation, the first processor receives operation result values of the second and third processors, and the first processor includes a result value comparator configured to compare the operation result values of the first, second and third processors and to output operation result values in correspondence with the result of comparison.

BRIEF DESCRIPTION OF THE DRAWINGS

Arrangements and embodiments will be described in detail with reference to the following drawings in which like reference numerals refer to like elements and wherein.

DETAILED DESCRIPTION

An apparatus and various methods, to which the embodiments of the present disclosure are applied, will now be described more fully hereinafter with reference to the accompanying drawings. The suffixes "module" and "unit" of elements herein are used for convenience of description and thus can be used interchangeably and do not have any distinguishable meanings or functions.

In the following description of the embodiments, it will be understood that, when each element is referred to as being formed "on" (above) or "under" (below) or "before" (ahead) or "after" (behind) the other element, it can be directly "on" (above) or "under" (below) or "before" (ahead) or "after" (behind) the other element or be indirectly formed with one or more intervening elements therebetween.

It will be understood that, although the terms first, second, A, B, (a), (b), etc. may be used herein to describe various elements of the present disclosure, these terms are only used to distinguish one element from another element and necessity, order, or sequence of corresponding elements are not limited by these terms. It will be understood that when one element is referred to as being "connected to", "coupled to", or "accessing" another element, one element may be "connected to", "coupled to", or "accessing" another element via a further element although one element may be directly connected to or directly access another element.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms are not interpreted as having ideal or excessively formal meanings.

Figure 1:
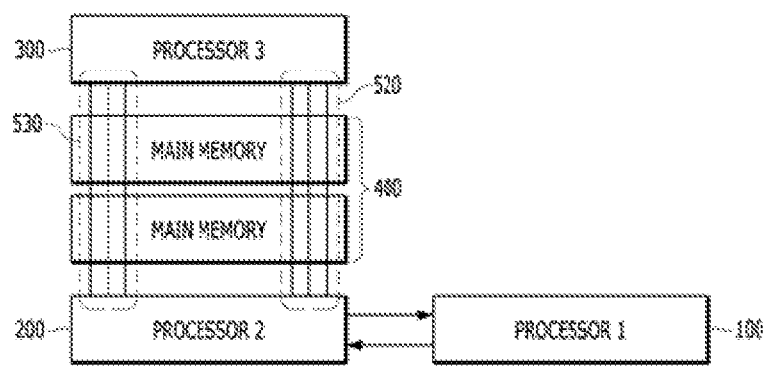
FIG. 1 is a diagram showing the configuration of a three-dimensional laminated memory system according to an exemplary embodiment of the present disclosure.

FIG. 1 is a diagram showing the configuration of a three-dimensional laminated memory system according to an exemplary embodiment of the present disclosure.

Referring to FIG. 1, the three-dimensional memory device may include a first processor 100, a second processor 200, a third processor 300 and a main memory 400.

The first, second, and third processors 100, 200, 300 each may be an electric circuitry (e.g., computer, microprocessor, CPU, ASIC, circuitry, etc.) that executes instructions of software which thereby performs various functions described hereinafter.

The first, second and third processors 100, 200 and 300 of the three-dimensional memory device may have the same hardware logic. At this time, the first, second and third processors 100, 200 and 300 may be physically isolated from each other. Therefore, the three-dimensional memory device may ensure safety for data processing through physical isolation of the processors.

The main memory 400 may be laminated between the second processor 200 and the third processor 300. At this time, the main memory 400 may be composed of at least one memory. For example, the main memory 400 may be implemented as a dynamic random access memory (DRAM). However, the present disclosure is not limited thereto and the main memory 400 may be implemented as any suitable memory capable of implementing a three-dimensional lamination structure.

A data bus may be a data passage necessary for each processor to perform operation. The data bus may transmit data from each processor to the main memory 400 or transmit data from the main data 400 to each processor. Therefore, data may be bidirectionally transmitted between each processor and the main memory 400.

The data bus may include a second data bus 520 dedicated to the second processor 200 and a third data bus 530 dedicated to the third processor 300. That is, the dedicated data buses may be physically allocated to the second processor 200 and the third processor 300 through data bus isolation.

The first processor may use the data buses respectively allocated to the second processor 200 and the third processor 300.

For example, if the total number of data buses is N, the number of data buses dedicated to the second processor 200 is N/2 and the number of data buses dedicated to the third processor 300 is N/2. Accordingly, since the first processor 100 may use all the data buses respectively allocated to the second processor 200 and the third processor 300, the number of data buses which may be used by the first processor 100 may be N. Further, the first processor 100 may receive result values according to data operation from the second and third processors 200 and 300. The data operation may include one or more arithmetic/logic operations (e.g., ADD, MULTIPLY, DIVIDE, COMPARE, SHIFT, AND, OR, XOR, etc.).

The processor 100 may receive data result values (hereinafter referred to as operation result values) calculated by the second processor 200 and the third processor 300 from the main memory 400.

The first processor 100 may determine whether the received operation result values of the processors are different. The first processor 100 may output matched values as the operation result values when all of the operation result values of the first, second and third processors 100, 200 and 300 match.

In addition, the first processor 100 may compare the numbers of identical operation result values when all of the operation result values of the processors do not match. For example, when a trap event occurs, the operation result values of the processors may not match.

The first processor 100 may include a result value comparator 110 for performing a voting mechanism based on the data operation result values. The result value comparator 110 may select result values having a large number of identical operation result values through the voting mechanism and transmit the result values as the operation result values.

For example, the result value comparator 110 may transmit the operation result values of two or more of the first, second and third processors 100, 200 and 300 as the operation result values.

Figure 2:
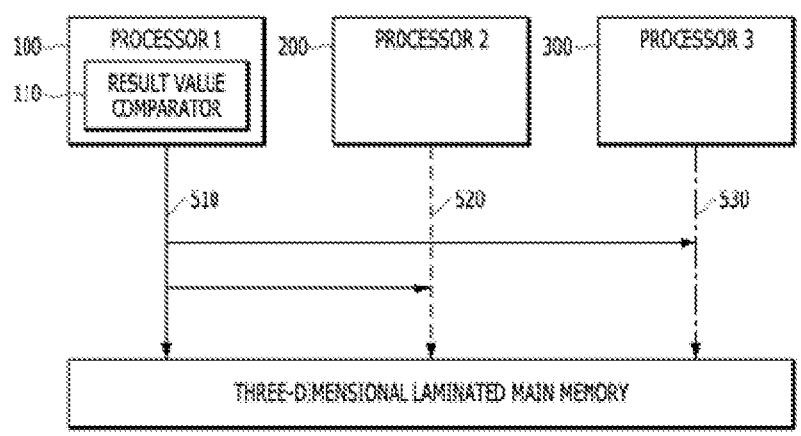
FIG. 2 is a diagram showing an independent data bus structure for redundancy of a three-dimensional laminated memory system according to an exemplary embodiment of the present disclosure.

FIG. 2 is a diagram showing an independent data bus structure for redundancy of a three-dimensional laminated memory system according to an exemplary embodiment of the present disclosure.

Referring to FIG. 2, the processors in the three-dimensional laminated memory system may use data buses in order to exchange data with the main memory 400. To this end, the first processor 100 may use all data buses of the three-dimensional laminated memory system. Each of the second and third processors may use dedicated data buses. For example, the first processor 100 may transmit and receive data to and from the main memory 400 using the first data bus 510, the second data bus 520 and the third data bus.

The second processor 200 may transmit and receive data to and from the main memory 400 using only the second data bus 520. That is, the second data bus 520 may be a first dedicated data bus allocated to the second processor 200.

The third processor 300 may transmit and receive data to and from the main memory 400 using only the third data bus. That is, the third data bus may be a second dedicated data bus allocated to the third processor 300.

Further, the first, second and third processors may read data from the main memory 400. At this time, the second processor 200 and the third processor 300 may read data from the main memory 400 with a predetermined delay time. Therefore, the three-dimensional memory device can ensure safety for data processing through data reading timing isolation.

For example, the first processor 100 and the second processor 200 may read data at the same timing and the third processor 300 may read data at timing delayed from the timing of the first and second processors by 2 cycles. Accordingly, different delay times are applied to the second and third processors.

Figure 3:
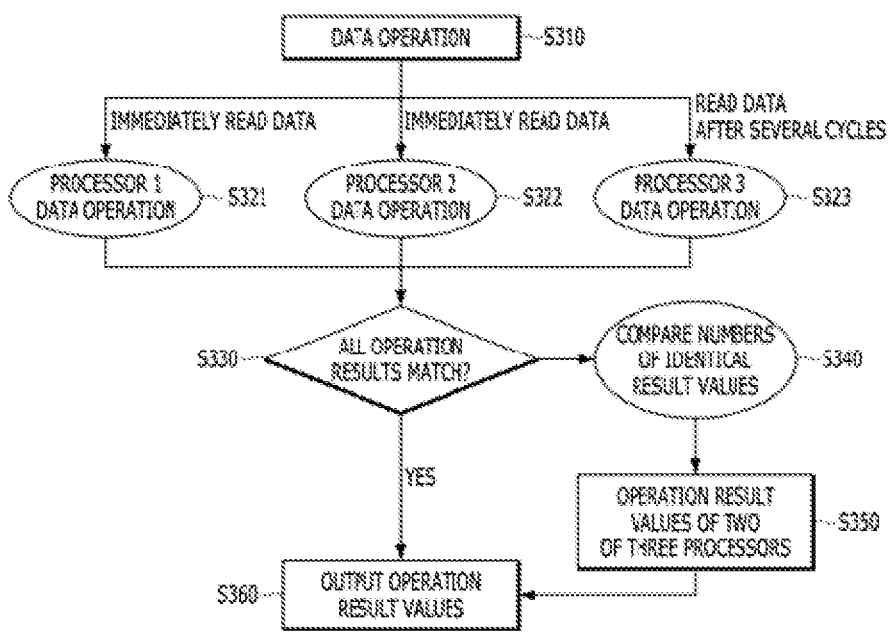
FIG. 3 is a flowchart illustrating a redundancy method of a three-dimensional laminated memory according to an exemplary embodiment of the present disclosure.

FIG. 3 is a flowchart illustrating a redundancy method of a three-dimensional laminated memory according to an exemplary embodiment of the present disclosure.

When the first, second and third processors 100, 200 and 300 read data from the main memory 400 for operation, the first processor 100 may read data from the main memory immediately after receiving a command for operation. The second processor 200 may read data from the main memory 400 immediately after receiving a command for operation. The third processor 300 may read data from the main memory 400 at a predetermined delay time after receiving a command for operation (S310).

After step S310, the first processor 100 may perform operation based on the data read from the main memory 400, thereby obtaining operation result values. The second processor 200 may perform operation based on the data read from the main memory 400, thereby obtaining operation result values. The third processor 300 may perform operation based on data, thereby obtaining operation result values (S321, S322, and S323).

After step S321, S322 or S323, the first processor 100 may receive the operation result values of the second processor 200 and the third processor 300 from the main memory 400 and determine whether all of the operation result values match (S330).

After step S330, when the operation result values do not match, the result value comparator 110 of the first processor 100 may compare the numbers of identical result values among the operation result values (S340).

After step S340, the result value comparator 110 may determine the result values as the operation result values when the operation result values of two of the first, second and third processors are identical (S350).

After step S350, the result value comparator 110 may output the matched results as the operation result values when all of the operation result values match (S360).

If step S330 is satisfied, the matched operation result values may be output.

The redundancy method and system of the three-dimensional laminated memory according to the present disclosure has the following effects.

The redundancy method and system of the three-dimensional laminated memory according to the exemplary embodiment of the present disclosure ensures hardware architecture technology for functional safety at a controller level and an operation mechanism based on the same, by improving stability and accuracy of data processing in preparation for commercialization of three-dimensional laminated memory semiconductor technology.

In particular, it is possible to develop software for processing a large amount of data, by ensuring redundancy architecture technology specialized for three-dimensional laminated memory technology through this/these inventive concept(s) in the present disclosure.

In addition, it is possible to reduce cost required to develop semiconductors for development of a controller according to three-dimensional laminated memory technology.

The method according to the embodiment may be implemented as software instructions for execution on a computer and stored in a computer-readable recording medium. Examples of the computer-readable recording medium include a ROM, a RAM, a CD-ROM, a magnetic tape, a floppy disk, and an optical data storage. The computer-readable recording medium can be distributed over a plurality of computer devices connected to a network so that computer-readable code is written thereto and executed therefrom in a decentralized manner. Functional programs, code, and code segments needed to realize the embodiments herein can be construed by one of ordinary skill in the art.

What is claimed is:

1. A redundancy method of a three-dimensional laminated memory, the redundancy method comprising:
   receiving, by first, second and third processors, a command for data operation;
   reading, by the second and third processors, data from a main memory after a predetermined delay time, when the command for the data operation is received;
   transmitting and receiving, by each of the second and third processors, data through dedicated data buses in order to perform the data operation;
   receiving, by the first processor, operation result values of the second and third processors from the main memory;
   comparing, by a result value comparator of the first processor, the operation result values of the first, second and third processors; and
   outputting, by the result value comparator, operation result values in correspondence with the result of comparison,
   wherein different delay times are applied to the second and third processors for data processing through data reading timing isolation.

2. The redundancy method according to claim 1, wherein the first, second and third processors independently perform a same data operation.

3. The redundancy method according to claim 1, wherein the main memory receives and stores operation result values from the first, second and third processors.

4. The redundancy method according to claim 1, wherein the comparing of the operation result values of the first, second and third processors includes determining whether all of the operation result values match.

5. The redundancy method according to claim 4, wherein the result value comparator compares numbers of identical operation result values when all of the operation result values do not match.

6. The redundancy method according to claim 5, wherein the outputting of the operation result values in correspondence with the result of comparison includes transmitting operation result values having a largest number of identical operation result values among the operation result values.

7. The redundancy method according to claim 1, wherein a first dedicated data bus allocated to the second processor and a second dedicated data bus allocated to the third processor are physically allocated within the main memory.

8. A non-transitory computer-readable recording medium having recorded thereon a program for realizing the redundancy method according to claim 1.

9. A redundancy system of a three-dimensional laminated memory, the redundancy system comprising:
- first, second and third processors physically isolated from each other;
- a main memory laminated between the second processor and the third processor; and
- a data bus including a first dedicated data bus allocated to the second processor and a second dedicated data bus allocated to the third processor,
- wherein the first, second and third processors perform data operation,
- wherein the second and third processors transmits and receives the data operation to and from the main memory after a predetermined delay time,
- wherein the first processor receives operation result values of the second and third processors,
- wherein the first processor includes a result value comparator configured to compare the operation result values of the first, second and third processors and to output operation result values in correspondence with the result of comparison, and
- wherein different delay times are applied to the second and third processors for data processing through data reading timing isolation.

10. The redundancy system according to claim 9, wherein the first, second and third processors independently perform a same data operation.

11. The redundancy system according to claim 9, wherein the main memory receives and stores operation result values from the first, second and third processors.

12. The redundancy system according to claim 9, wherein the result value comparator determines whether all of the operation result values match.

13. The redundancy system according to claim 12, wherein the result comparator compares numbers of identical operation result values when all of the operation result values do not match.

14. The redundancy system according to claim 13, wherein the result value comparator transmits operation result values having a largest number of identical operation result values among the operation result values.

15. The redundancy system according to claim 9, wherein the first dedicated data bus allocated to the second processor and the second dedicated data bus allocated to the third processor are physically allocated within the main memory.

* * * * *